(12) United States Patent
Oda et al.

(10) Patent No.: US 7,518,491 B2
(45) Date of Patent: Apr. 14, 2009

(54) ULTRASONIC OBJECT DETECTOR

(75) Inventors: Kiyonari Oda, Gamagori (JP);
Hisanaga Matsuoka, Okazaki (JP);
Yoshihisa Sato, Nagoya (JP); Koji Kato, Aichi-gun (JP)

(73) Assignees: Nippon Soken, Inc., Nishio, Aichi-Pref. (JP); Denso Corporation, Kariya, Aichi-Pref. (JP)

( * ) Notice: Subject to any disclaimer, the term of this patent is extended or adjusted under 35 U.S.C. 154(b) by 270 days.

(21) Appl. No.: 11/492,925

(22) Filed: Jul. 26, 2006

(65) Prior Publication Data
US 2007/0024432 A1 Feb. 1, 2007

(30) Foreign Application Priority Data
Aug. 1, 2005 (JP) .............................. 2005-223294

(51) Int. Cl.
*B60Q 1/00* (2006.01)
(52) U.S. Cl. .................. 340/436; 340/435; 340/904; 340/693.5; 180/274; 280/735
(58) Field of Classification Search .......... 340/436, 340/435, 693, 693.5; 180/274; 280/735; 200/61.58 R; 360/904, 665, 581, 567, 566, 360/943, 552–557; 361/730, 600
See application file for complete search history.

(56) References Cited

U.S. PATENT DOCUMENTS

| | | | |
|---|---|---|---|
| 4,918,672 A * | 4/1990 | Iwabuchi et al. | ............... 367/99 |
| 5,436,060 A | 7/1995 | Saurer et al. | |
| 5,629,690 A | 5/1997 | Knoll | |
| 5,844,471 A * | 12/1998 | Daniel | .......................... 340/436 |
| 6,318,774 B1 | 11/2001 | Karr et al. | |
| 6,759,950 B2 * | 7/2004 | Nishimoto et al. | ........... 340/436 |
| 6,931,930 B2 | 8/2005 | Reck | |
| 7,164,349 B2 * | 1/2007 | Kawaura et al. | ............. 340/435 |

FOREIGN PATENT DOCUMENTS

| | | |
|---|---|---|
| DE | 42 38 924 A1 | 5/1994 |
| EP | 0 427 649 A1 | 5/1991 |
| GB | 2 272 819 A | 5/1994 |
| JP | 62-240890 | 10/1987 |
| JP | 10-123236 | 5/1998 |
| JP | 2000-253495 | 9/2000 |
| JP | 2001-16694 | 1/2001 |
| JP | 2002-58091 | 2/2002 |
| JP | 2004-219248 | 8/2004 |

OTHER PUBLICATIONS

German Office Action and English translation dated Oct. 11, 2007 for counterpart application No. DE 10 2006 034 997.0-35.
Examination Report dated Aug. 20, 2008 in the FR Application No. 0607011 with English translation.

* cited by examiner

*Primary Examiner*—Anh V La
(74) *Attorney, Agent, or Firm*—Nixon & Vanderhye PC

(57) ABSTRACT

An object detector capable of reliably detecting objects around a vehicle is mounted on a wall of a bumper of a vehicle. Thicknesses of the bumper and of a bottom surface portion of a housing are less than one-half the wavelength of ultrasonic waves generated by a piezoelectric vibrator. This suppresses the reflection of ultrasonic waves by the bumper and by the bottom surface portion of the housing, and enhances the ultrasonic wave propagation efficiency, making it possible to reliably detect objects positioned around the vehicle.

15 Claims, 6 Drawing Sheets

ULTRASONIC OBJECT DETECTOR

CROSS REFERENCE TO RELATED APPLICATION

This application is based on and incorporates herein by reference Japanese Patent Application No. 2005-223294 filed on Aug. 1, 2005.

FIELD OF THE INVENTION

This invention relates to an ultrasonic object detector for detecting nearby objects.

BACKGROUND OF THE INVENTION

There has heretofore been known a device for detecting nearby objects existing around a vehicle. U.S. Pat. No. 6,318,774 (International Patent Publication No. 2001-527480A) discloses a device, wherein a bumper of a vehicle is perforated, and an ultrasonic sensor is inserted in the holes so that the head portion of the sensor is in flush with the outer surface of the bumper. With this device, however, the ultrasonic sensor is exposed to the exterior of the vehicle impairing appearance of the vehicle.

To cope with this problem, JP-A-10-123236 discloses a device, wherein a recessed portion is formed in the back side of a bumper of a vehicle, and an ultrasonic sensor is fitted into the recessed portion without permitting the device itself to be seen from the outer side to favorably maintain appearance of the vehicle. According to this device, however, the ultrasonic sensor operates while being fitted into the recessed portion on the back side of the bumper of the vehicle. Namely, the ultrasonic sensor transmits and receives ultrasonic waves through a wall of the bumper of the vehicle and, hence, propagation efficiency of ultrasonic waves drops and the sensitivity decreases.

SUMMARY OF THE INVENTION

This invention is accomplished in view of the above problems, and has an object of providing an ultrasonic object detector capable of reliably detecting objects existing around it.

According to one aspect of the present invention, an ultrasonic object detector has an ultrasonic sensor having a piezoelectric vibrator. This piezoelectric vibrator is mounted on a wall member. Thus, ultrasonic waves generated by the piezoelectric vibrator are transmitted from the ultrasonic sensor through the wall member, and ultrasonic waves reflected in the exterior are received by the piezoelectric vibrator through the wall member. The thickness of the wall member is less than one-half a wavelength of the ultrasonic waves transmitted and received by the piezoelectric vibrator.

BRIEF DESCRIPTION OF THE DRAWINGS

The above and other objects, features and advantages of the present invention will become more apparent from the following detailed description made with reference to the accompanying drawings. In the drawings.

DESCRIPTION OF THE PREFERRED EMBODIMENTS

First Embodiment

Figure 1:
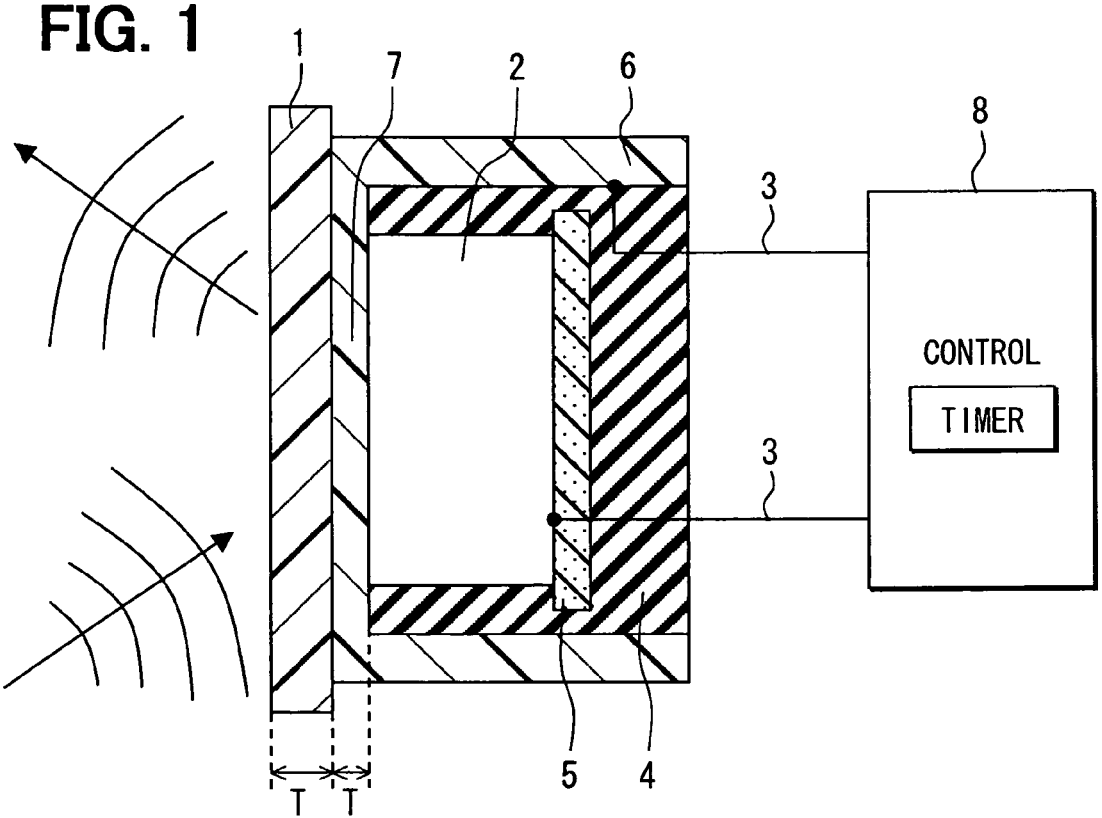
FIG. 1 is a schematic diagram illustrating an object detector according to a first embodiment of this invention.
Figure 2:
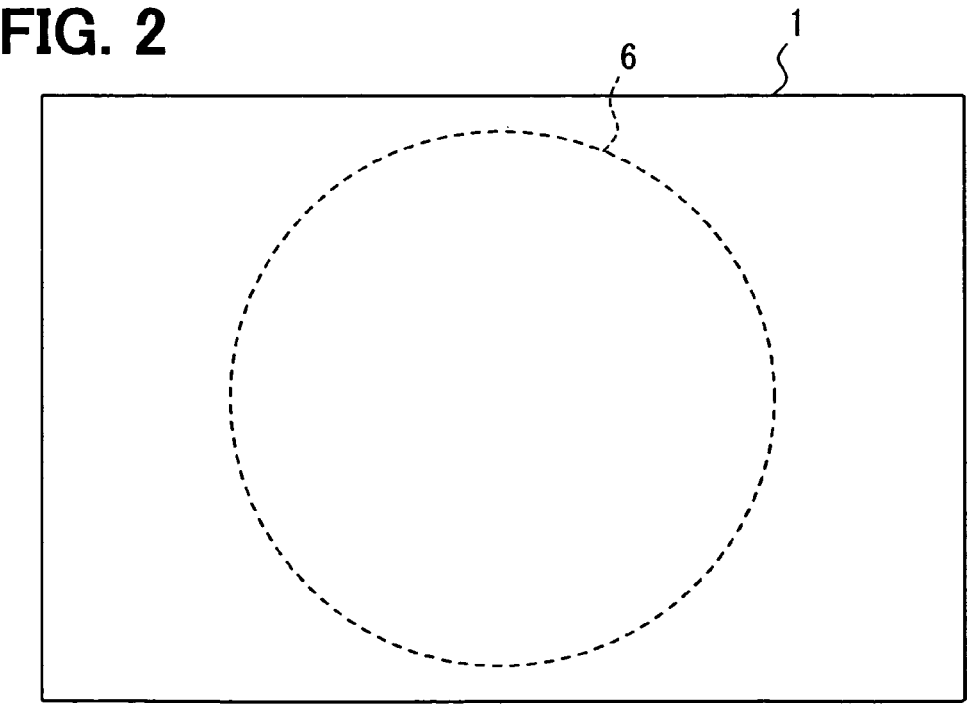
FIG. 2 is a front view of a bumper mounting an ultrasonic sensor of the object detector in the first embodiment as seen from the front side of the bumper.

According to a first embodiment shown in FIGS. 1 and 2, an ultrasonic object detector is constructed with an ultrasonic sensor, which includes a piezoelectric vibrator 2, lead wires 3, a vibration absorber 4, a sound-absorbing member 5 and a housing 6 of a cylindrical shape. The object detector also includes an electronic control circuit 8. The ultrasonic sensor is mounted to be in contact with the back side of a wall of a bumper 1 of a vehicle. The wall of the bumper 1 forms a part of an outer contour of the vehicle. Thus, the ultrasonic sensor is concealed in the bumper 1 and not exposed to an exterior of the bumper 1.

The piezoelectric vibrator 2 is a piezoelectric ceramic produced by press-firing a powder of a metal oxide such as barium titanate and is disposed on a bottom surface portion 7 of the housing 6. When a pulse voltage is applied from the lead wires 3 from the control circuit 8, the piezoelectric vibrator 2 undergoes the distortion due to dielectric polarization and vibrates in the direction of thickness in an axial direction of the housing 6, that is, from the back side toward the front side of the bumper 1, to generate ultrasonic waves. The generated ultrasonic waves propagate to the bumper 1 via the bottom surface portion 7 of the housing 6 and are transmitted to the exterior of the vehicle from the bumper 1.

Upon receipt of ultrasonic waves through the bumper 1 and the bottom surface portion 7 of the housing 6, further, the piezoelectric vibrator 2 forms pulse signals due to the piezoelectric effect and outputs them to the control circuit 8 through the lead wires 3. The piezoelectric vibrator 2 may be made of such a material as quartz or Rochelle salt. The bumper 1 may be made of a resin such as polypropylene or urethane.

The vibration absorber 4 maybe made of, for example, a silicone rubber which absorbs vibration that is produced accompanying the traveling of the vehicle. The vibration may be absorbed by using, for example, a polystyrene or the like.

The sound-absorbing member 5 is made of, for example, a silicone sponge which absorbs ultrasonic waves emitted to the back side of the piezoelectric vibrator 2. The ultrasonic waves may be absorbed by using, for example, cotton. The housing 6 is constructed by using, for example, a plastic material and is so mounted that its bottom surface portion 7 is in contact with the back side of the bumper 1. The housing 6 may be made by using, for example, PET or the like.

In this embodiment, in particular, the bumper 1 and the bottom surface portion 7 of the housing 6 have thicknesses which are not greater than one-half the wavelength λ of ultrasonic waves generated by the piezoelectric vibrator 2. When the thicknesses of the bumper 1 and of the bottom surface portion 7 of the housing 6 become not smaller than one-half the wavelength λ of ultrasonic waves, the transmission factors of the bumper 1 and of the bottom surface portion 7 of the housing 6 decrease for the ultrasonic waves transmitted and received by the piezoelectric vibrator 2; i.e., the reflection factor increases and the propagation efficiency drops. By selecting the thicknesses of the bumper 1 and of the bottom surface portion 7 of the housing to be less than one-half the wavelength λ of ultrasonic waves generated by the piezoelectric vibrator 2, it is allowed to suppress the reflection of ultrasonic waves by the bumper 1 and by the bottom surface portion 7 of the housing 6 and, hence, to increase the ultrasonic wave propagation efficiency.

The control circuit 8 is constructed by using a computer and outputs a pulse signal onto the lead wires 8 at regular intervals. The control circuit 8 has an internal timer (not shown) that is reset every time when a pulse signal is output. When a pulse signal, reflected by an outside object, is received from the lead wires 3 after the pulse signal has been output onto the lead wires 3, the control circuit 8 calculates a distance up to the object existing around the vehicle based upon a time measured by the timer, i.e., based upon the time that has elapsed after the transmission of ultrasonic waves in the last time.

In this object detector, the thicknesses of the bumper 1 and of the bottom surface portion 7 of the housing 6 are selected to be not greater than one-half the wavelength λ of ultrasonic waves generated by the piezoelectric vibrator 2. This suppresses the reflection of ultrasonic waves by the bumper 1 and by the bottom surface portion 7 of the housing 6, and enhances the ultrasonic wave propagation efficiency, making it possible to reliably detect objects positioned around the vehicle.

Second Embodiment

Figure 3:
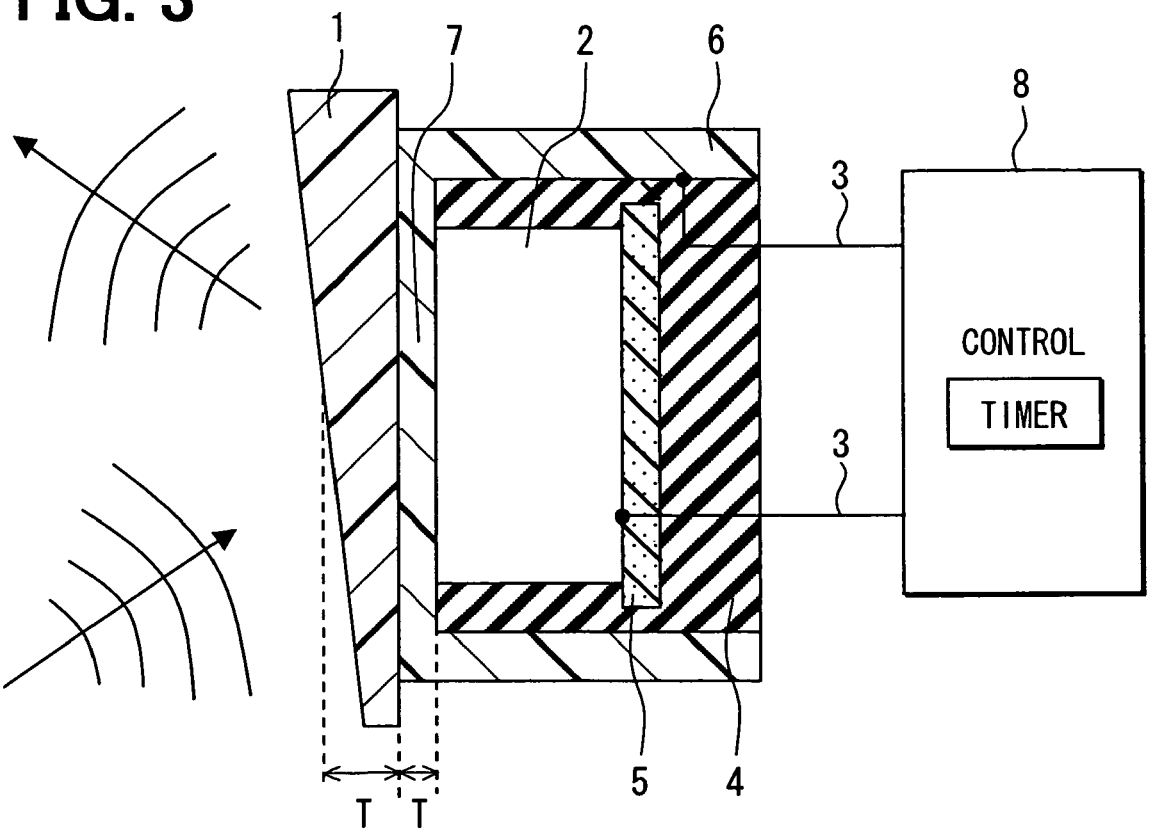
FIG. 3 is a schematic diagram illustrating an object detector according to a second embodiment of this invention.

In a second embodiment shown in FIG. 3, the bumper 1 is so constructed as to possess a varying (non-uniform) thickness.

Specifically, the bumper 1 has a thickness which is one-half the wavelength λ of ultrasonic waves at a portion that comes in contact with the axis of cylinder of the ultrasonic sensor. The thickness is greater than one-half the wavelength λ of ultrasonic waves at a portion that comes in contact with the upper portion of the ultrasonic sensor, and the thickness is smaller than one-half the wavelength λ of ultrasonic waves at a portion that comes in contact with the lower portion of the ultrasonic sensor. This assures efficient transmission and reception of ultrasonic waves even when the wavelength of the ultrasonic waves has changed due to a change in the temperature. Further, the time until the ultrasonic waves generated by the piezoelectric vibrator 2 is radiated to the exterior of the vehicle varies in small amounts depending upon the portions where it is mounted, giving rise to the occurrence of interference among the ultrasonic waves. As a result, the horizontal directivity and vertical directivity of the ultrasonic sensor can be varied, preventing such an occurrence that the road or the curb is erroneously detected as an object.

The above construction makes it possible to efficiently transmit and receive ultrasonic waves even when the wavelength of ultrasonic waves has changed due to a change in the temperature. The above construction further prevents the road or the curb from being erroneously detected as an object.

Third Embodiment

Figure 4:
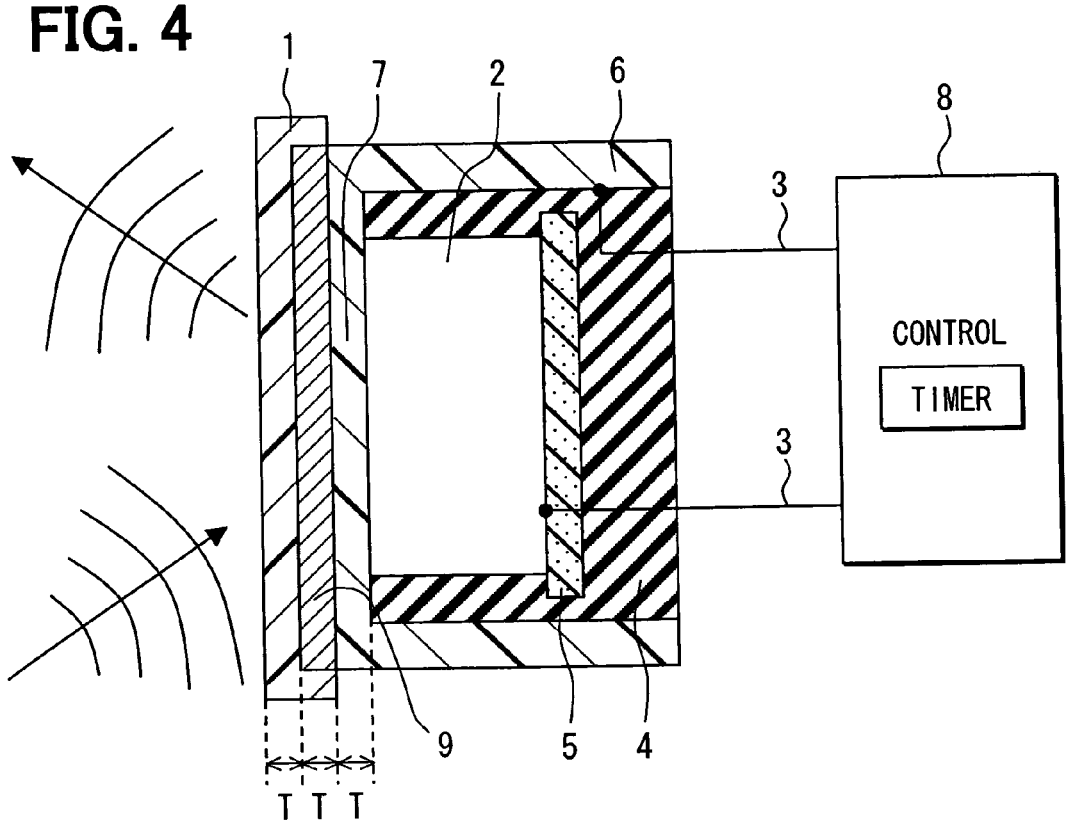
FIG. 4 is a schematic diagram illustrating an object detector according to a third embodiment of this invention.

In a third embodiment shown in FIG. 4, a sensitivity-adjusting member 9 is plate-shaped and attached to the back side of the bumper 1 as part of the bumper 1.

Specifically, the sensitivity-adjusting member 9 is made of a material having a modulus of elasticity that varies little depending upon the temperature, is so constructed as to be in agreement with the shape of the bottom surface portion 7 of the housing 6, and is fitted into a recessed portion formed on the back side of the bumper 1. By using the material having a modulus of elasticity that varies little depending upon the temperature as a sensitivity-adjusting material, it is allowed to suppress a change in the wavelength of ultrasonic waves propagating through the sensitivity-adjusting material caused by a change in the temperature and to enhance the propagation efficiency. Like the thicknesses of the bumper 1 and of the bottom surface portion 7 of the housing 6 of the vehicle, the thickness of the sensitivity-adjusting member 9 is selected to be not greater than one-half the wavelength λ of ultrasonic waves generated by the piezoelectric vibrator 2 in order to enhance the propagation efficiency of the ultrasonic waves.

The above construction makes it possible to further enhance the ultrasonic wave propagation efficiently and to more reliably detect objects positioned around the vehicle.

In this embodiment, the sensitivity-adjusting material 9 is made of a material having a modulus of elasticity that varies little depending upon the temperature. Not being limited thereto only, however, there can also be used such a material that has an acoustic impedance smaller than that of the bumper 1 of the vehicle. This construction, too, makes it possible to suppress the reflection of ultrasonic waves, to enhance the ultrasonic wave propagation efficiency and to efficiently radiate ultrasonic waves to the exterior of the vehicle. The above acoustic impedance Z can be given by the following formula, $$Z = \rho \cdot \sqrt{[(E/\rho) \cdot \{(1-\nu)/\{(1+\nu) \cdot (1-2\nu)\}\}]}$$

where $\rho$ is a density of a medium through which ultrasonic waves propagate, E is a modulus of elasticity of the medium through which the ultrasonic waves propagate, and $\nu$ is a Poisson's ratio of the medium through which the ultrasonic waves propagate.

Further, a metal may be used as the material of the sensitivity-adjusting material 9. In this case, the sensitivity-adjusting member works as a conductor for flowing an electric current to the piezoelectric vibrator 2, and the construction of the device can be simplified.

Figure 5:
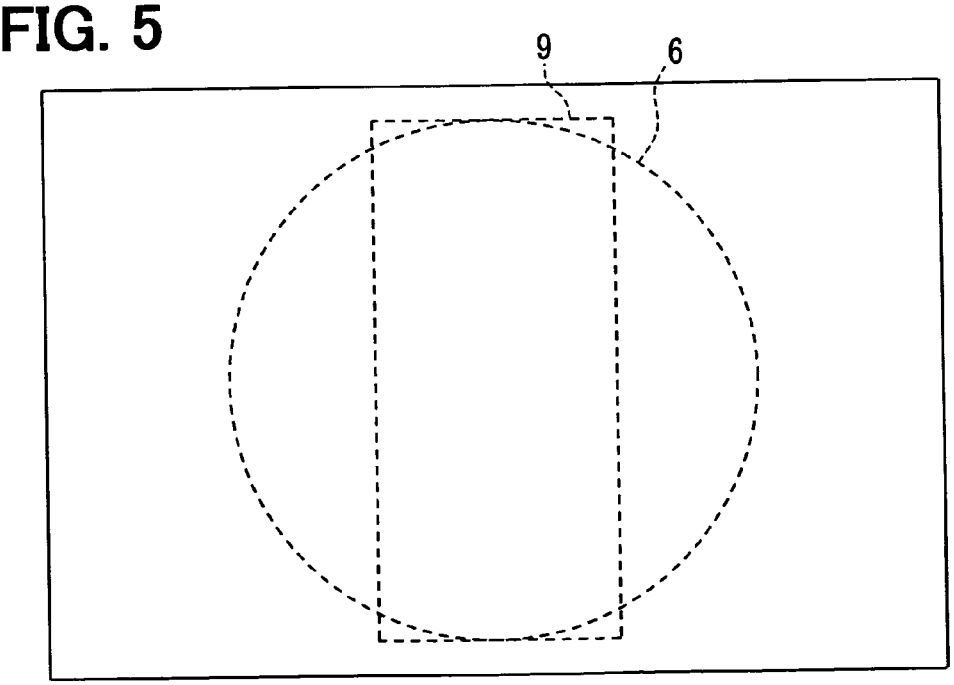
FIG. 5 is a front view illustrating a bumper where the ultrasonic sensor is mounted as viewed from the front side of the bumper in a case where a sensitivity-adjusting member of a rectangular shape in cross section is mounted.

The sensitivity-adjusting member 9 of this embodiment is so constructed that the sectional shape thereof perpendicular to the direction of thickness (direction from the back side of the bumper 1 toward the front side thereof) is in agreement with the shape (cylindrical) of the bottom surface portion 7 of the housing 6. Not being limited thereto only, however, the sectional shape thereof may be such that the ratio is not the same in the horizontal direction and in the vertical direction. Namely, the ratio is not the same in the horizontal direction and in the vertical direction at a portion where ultrasonic waves are emitted, making it possible to vary the horizontal directivity and the vertical directivity of the ultrasonic wave sensor. For instance, as shown in FIG. 5, the above sectional shape may be of a rectangular shape in which one side is short in the horizontal direction and the other side is long in the vertical direction. This broadens the radiation of ultrasonic waves in the vertical direction, creating a sharp directivity while suppressing the effect of ultrasonic waves reflected by the road and curve. Further, the radiation of ultrasonic waves becomes narrow in the horizontal direction, creating a broad directivity and making it possible to more reliably detect objects.

Further, the sensitivity-adjusting member 9 is so constructed that the sectional shape thereof perpendicular to the direction of thickness (direction from the back side of the bumper 1 to the front side thereof) remains the same at any position in the direction of thickness. Not being limited thereto only, however, the construction may be such that the shape varies depending upon a position in the direction of thickness. This makes it possible to vary the horizontal directivity and vertical directivity of the ultrasonic wave sensors while suppressing the attenuation of ultrasonic waves that propagate through the sensitivity-adjusting member 9.

Figure 6:
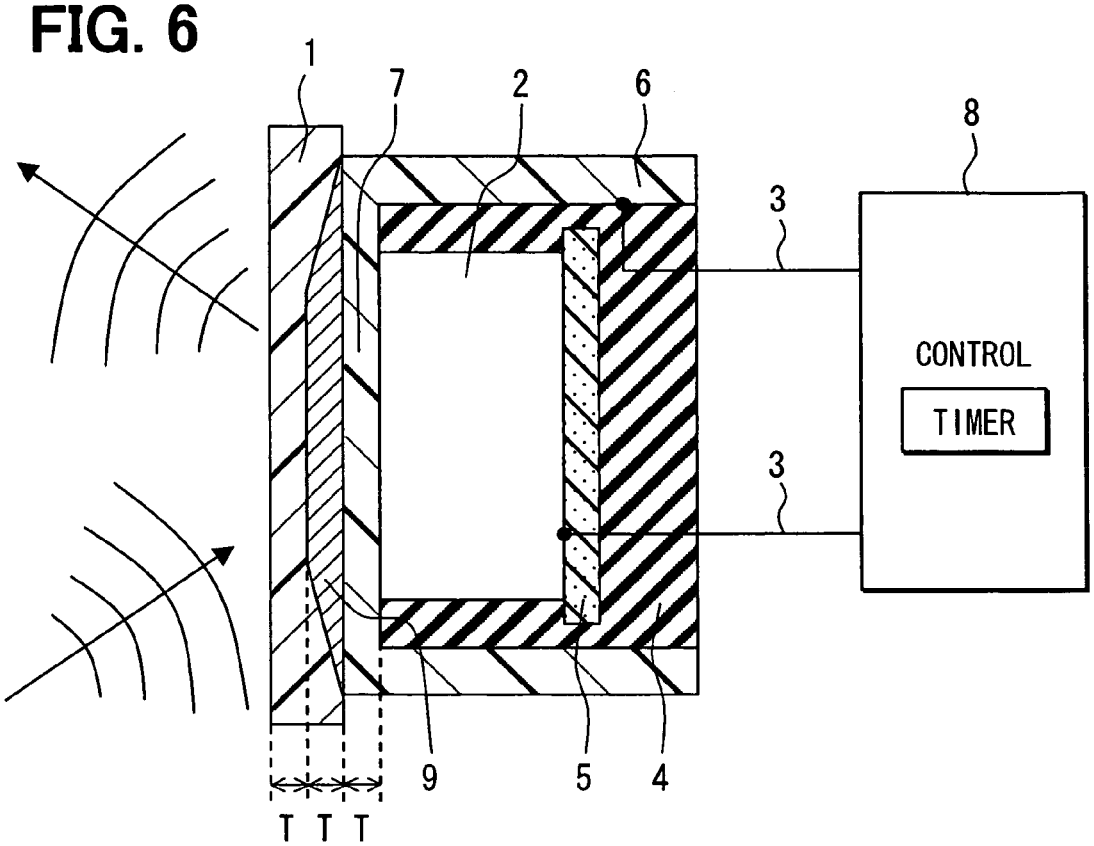
FIG. 6 is a schematic diagram illustrating an object detector which is provided with a sensitivity-adjusting member of the shape of a truncated cone.
Figure 7:
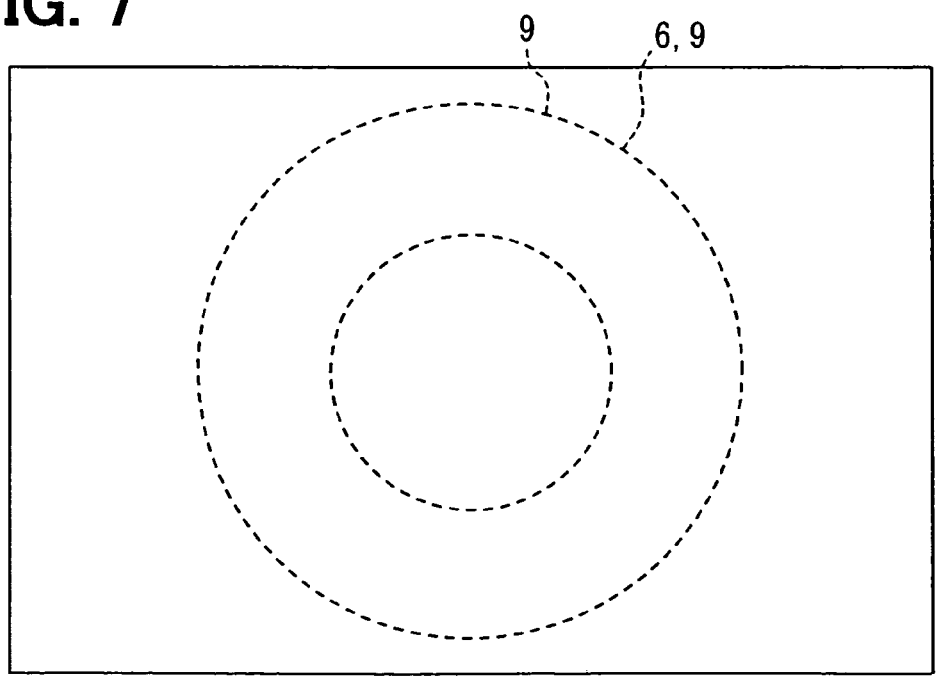
FIG. 7 is a front view illustrating a bumper where the ultrasonic sensor is mounted as viewed from the front side of the bumper in a case where a sensitivity-adjusting member of the shape of the truncated cone is mounted.

For instance, the sensitivity-adjusting member 9 may be constructed in the shape of a truncated cone having a cross section that becomes narrow from the back side of the bumper 1 toward the front side thereof as shown in FIGS. 6 and 7. This makes it possible to broaden the directivity by narrowing the radiation of ultrasonic waves while suppressing the attenuation of ultrasonic waves that propagate through the sensitivity-adjusting member 9.

Contrary to the above, further, the sensitivity-adjusting member 9 may be constructed in the shape of a truncated cone having a cross section that becomes broad from the back side of the bumper 1 toward the front side thereof. This makes it possible to sharpen the directivity by broadening the radiation of ultrasonic waves while suppressing the attenuation of ultrasonic waves that propagate through the sensitivity-adjusting member 9.

In this embodiment, the sensitivity-adjusting member 9 is mounted being fitted into the recessed portion formed on the back side of the bumper 1. Not being limited thereto only, however, the bumper 1 may be perforated to form a hole therein, and the sensitivity-adjusting member 9 may be exposed through the hole, i.e., the portion of the bumper 1 on which the ultrasonic sensor is mounted as a whole may be made of the sensitivity-adjusting member.

Fourth Embodiment

Figure 8:
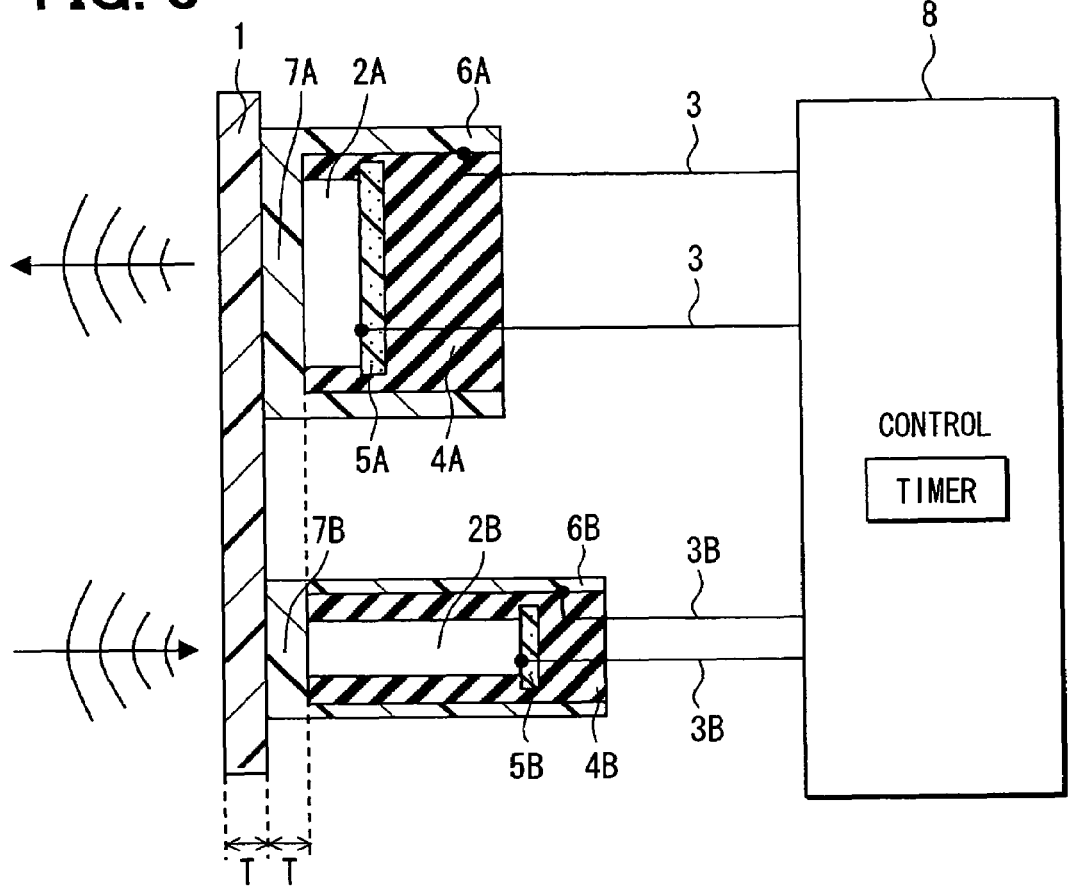
FIG. 8 is a schematic diagram illustrating an object detector according to a fourth embodiment of this invention.

In a fourth embodiment shown in FIG. 8, two ultrasonic sensors, one for transmission of ultrasonic waves and the other for reception of reflected ultrasonic waves, are attached to the back side of the bumper 1. The sensor for transmission is constructed by a piezoelectric vibrator 2A, lead wires 3A, vibration absorber 4A, sound-absorbing member 5A and a cylindrical housing 6A like the ultrasonic sensor of the first embodiment. The sensor for reception is constructed by a piezoelectric vibrator 2B, lead wires 3B, vibration absorber 4B, sound-absorbing member 5B and a housing 6B like the ultrasonic sensor of the above first embodiment.

Figure 10A:
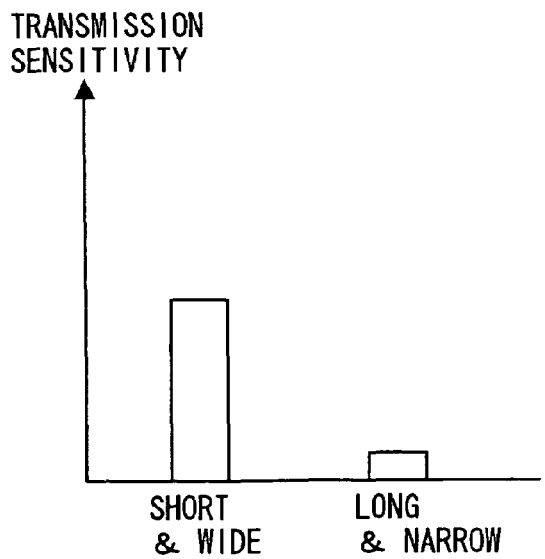
FIGS. 10A and 10B are graphs illustrating transmission sensitivity and reception sensitivity corresponding to the length of the ultrasonic sensor in the axial direction and to the sectional area thereof.

The piezoelectric vibrator 2A has a smaller length in the perpendicular direction to the contact surface between the bumper 1 and the bottom surface portion 7A of the housing 6A and has a larger sectional area of the piezoelectric vibrator 2A than those of the sensor for reception. This makes it possible to radiate ultrasonic waves with a strong power and to improve the transmission sensitivity as understood from FIG. 10A.

Figure 10B:
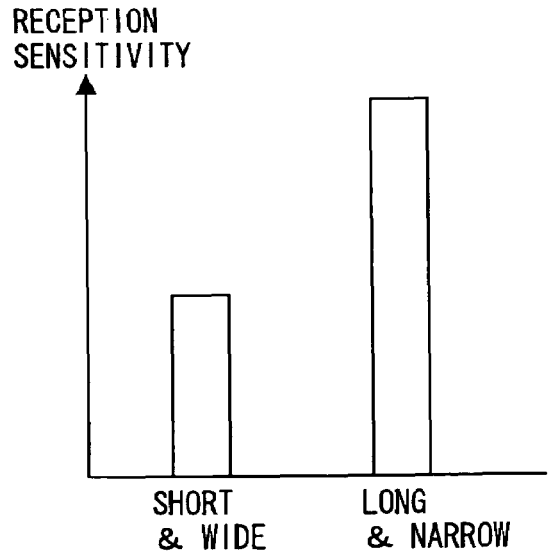

The piezoelectric vibrator 2B has a larger length in the perpendicular direction to the contact surface between the bumper 1 and the bottom surface portion 7B of the housing 6B and has a smaller sectional area of the piezoelectric vibrator 2B than those of the sensor for transmission. This makes it possible to receive even very weak ultrasonic waves and to improve the reception sensitivity as understood from FIG. 10B.

The control circuit 8 of this embodiment outputs the pulse signal onto the lead wires 3A at regular intervals to drive the piezoelectric vibrator 2A. The control circuit 8 resets the internal timer every time when the pulse signal is output onto the lead wires 3A. When a reflected pulse signal is received from the lead wires 3B, the control circuit 8 calculates a distance up to an object existing around the vehicle based upon a time measured by the timer, i.e., based upon the time that has elapsed after having transmitted the ultrasonic waves from the sensor for transmission in the last time.

As described above, ultrasonic waves are transmitted by using the sensor for transmission and are received by using the sensor for reception, making it possible to transmit and receive ultrasonic waves with good accuracy.

Fifth Embodiment

Figure 9:
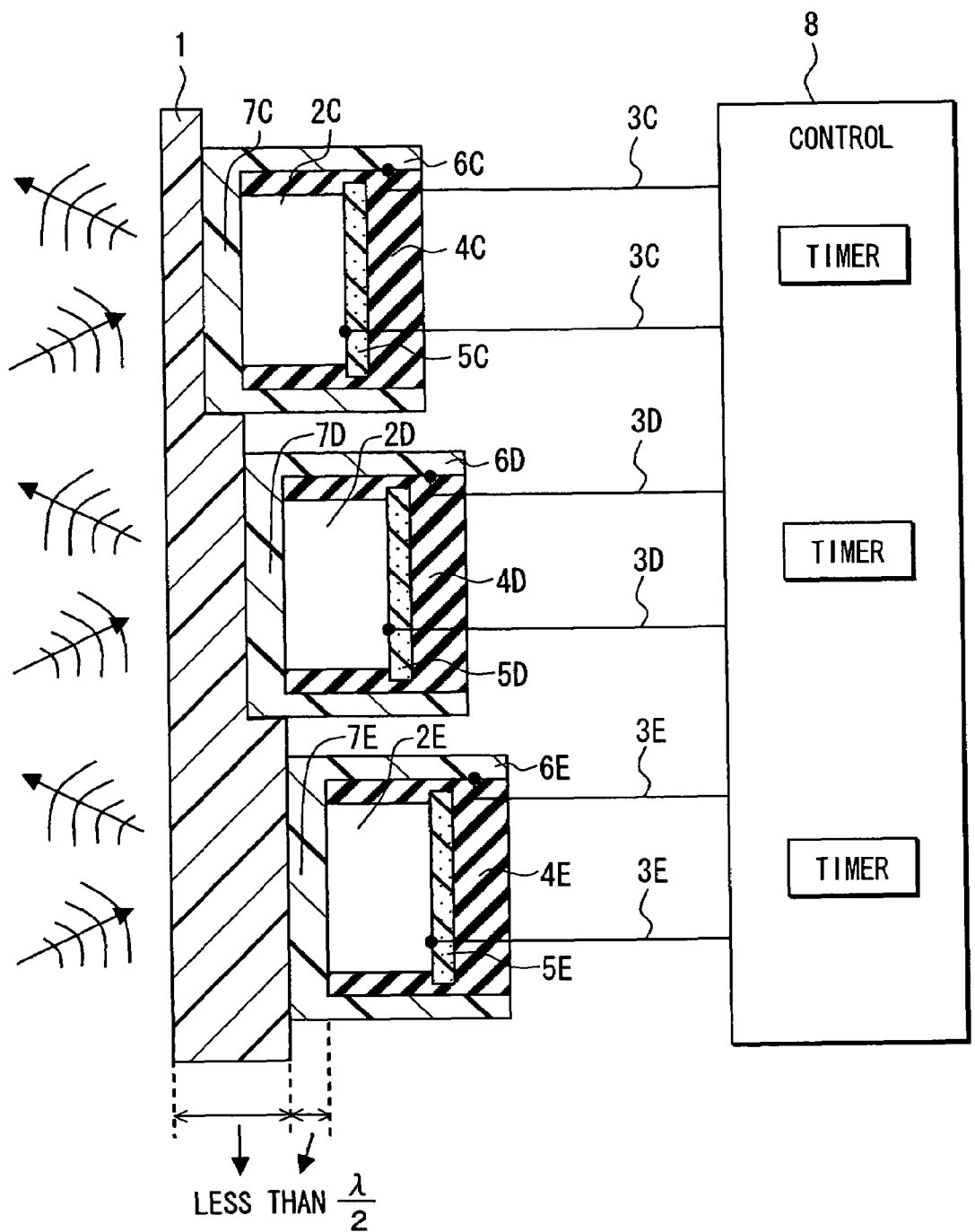
FIG. 9 is a schematic diagram illustrating an object detector according to a fifth embodiment of this invention.

In a fifth embodiment shown in FIG. 9, three ultrasonic sensors are attached to the bumper. Specifically, a first sensor is constructed with a piezoelectric vibrator 2C, lead wires 3C, vibration absorber 4C, sound-absorbing member 5C and a housing 6C like the ultrasonic sensor of the first embodiment. The bottom surface portion 7C of the housing 6C is mounted on the back side of the bumper 1 of the vehicle. A second sensor and a third sensor, too, are constructed in the same manner as the first sensor. These sensors are mounted to the bumper 1 at locations of different wall thicknesses.

The control circuit 8 outputs pulse signals to the first to third sensors at regular intervals through the lead wires 3C, 3D and 3E. The control circuit 8 has three internal timers that correspond to the first to third sensors, and are reset every time when the pulse signals are output onto the lead wires, respectively. When reflected pulse signals are received from the lead wires 3C, 3D and 3E, the control circuit 8 stops the corresponding internal timers and stores the time that has elapsed and is measured. When the pulse signals are obtained from the lead wires, the control circuit 8 calculates a distance up to an object positioned around the vehicle from the elapsed time measured by the internal timer corresponding to the ultrasonic sensor that has received the strongest pulse signal, i.e., that has the highest reception sensitivity. Thus, this embodiment makes it possible to further reliably detect the object positioned around the vehicle.

In the above embodiments, the wall thickness of the outer contour portion of the vehicle and the wall thickness of the bottom surface portion of the housing are selected to be not larger than one-half the wavelength of ultrasonic waves transmitted and received by the piezoelectric vibrator. However, the most desired effect is obtained when the thickness of the outer contour portion of the vehicle and the thickness of the bottom surface portion of the housing are selected to be one-fourth the wavelength of ultrasonic waves transmitted and received by the piezoelectric vibrator. This most suppresses the reflection of ultrasonic waves by the outer contour portion of the vehicle and by the bottom surface portion of the housing, and most enhances the ultrasonic wave propagation efficiency.

In the above embodiments, the piezoelectric vibrator is disposed on the bottom surface portion of the housing, the bottom surface portion of the housing being mounted in contact with the back surface of the bumper. Not being limited thereto only, however, the bottom surface portion of the housing may be removed, and the piezoelectric vibrator may be directly mounted on the back side of the bumper of the vehicle. Alternatively, a liquid material such as grease or oil may be interposed between the bottom surface portion of the housing and the bumper of the vehicle. This further improves the ultrasonic wave propagation efficiency. Further, the bumper of the vehicle may be perforated to form a hole through which the bottom portion of the housing may be exposed.

In the above embodiments, the piezoelectric vibrator generates ultrasonic waves due to vibration in the longitudinal direction (direction of thickness). This piezoelectric vibrator has a small Q-value (value proportional to a frequency f of ultrasonic waves with which an electric impedance Z becomes a minimum, that is divided by a difference $\Delta f$ in the frequency between two ultrasonic waves that form a predetermined electric impedance Z), and generates frequencies over a wide range. Therefore, when the ultrasonic wave propagation characteristics are varied due to a change in the temperature, the period of pulse signal output from the control circuit may be varied to change the frequency of ultrasonic waves that are generated to thereby suppress a drop in the ultrasonic wave propagation efficiency.

In the above embodiments, further, the piezoelectric vibrator generates ultrasonic waves due to the vibration in the longitudinal direction (direction of thickness). Not being limited thereto only, however, the ultrasonic waves may be generated by vibrating the piezoelectric vibrator in the radial direction by, for example, decreasing the thickness of the piezoelectric vibrator. This also makes it possible to favorably transmit and receive ultrasonic waves. A piezoelectric vibrator of a stacked-layer structure can also be favorably used.

In the above embodiments, further, the thicknesses of the bumper and the housing are selected to be not larger than one-half the wavelength $\lambda$ of ultrasonic waves transmitted and received by the piezoelectric vibrator. In order to further enhance the ultrasonic wave propagation efficiency, it is desired that the thicknesses are selected to be one-fourth the wavelength of ultrasonic waves transmitted and received by the piezoelectric vibrator. This most suppresses the reflection of ultrasonic waves and most enhances the ultrasonic wave propagation efficiency.

Still further, the ultrasonic sensor may be mounted on any wall members other than the bumper of the vehicle.

What is claimed is:

1. An object detector for a vehicle comprising:
a wall member of a vehicle bumper; and
an ultrasonic sensor having a piezoelectric vibrator mounted on a back surface of the vehicle bumper wall member in contact with and concealed by the bumper wall member, so that ultrasonic waves generated by the piezoelectric vibrator are transmitted from the ultrasonic sensor to an exterior region through the bumper wall member, and ultrasonic waves reflected from points exterior to the wall member are received by the piezoelectric vibrator back through the bumper wall member, wherein (a) the thickness of the bumper wall member is less than one-half a wavelength of the ultrasonic waves transmitted and received by the piezoelectric vibrator, and (b) the thickness of the bumper wall member is non-uniform.

2. The object detector as in claim 1, wherein:
the ultrasonic sensor has a housing with a bottom surface portion attached to the bumper wall member;
the piezoelectric vibrator is mounted on the bottom surface portion of the housing, and transmits and receives the ultrasonic waves through both the bottom surface portion and the bumper wall member; and
a thickness of the bottom surface portion is less than one-half the wavelength of the ultrasonic waves transmitted and received by the piezoelectric vibrator.

3. The object detector as in claim 2, wherein:
the thickness of the bumper wall member and the thickness of the bottom surface portion are each one-fourth the wavelength of ultrasonic waves transmitted and received by the piezoelectric vibrator.

4. The object detector as in claim 1, wherein:
the thickness of the bumper wall member is non-uniform at the location of a single sensor.

5. The object detector as in claim 1, wherein:
an ultrasonic sensor is provided at each of a plurality of respectively associated locations, where the bumper wall member has a different respective thickness at each said location.

6. The object detector as in claim 1, comprising:
a transmitting sensor used only for transmitting the ultrasonic waves and a receiving sensor used only for receiving the ultrasonic waves.

7. The object detector as in claim 6, wherein:
a piezoelectric vibrator of the transmitting sensor has a length shorter in a direction perpendicular to a surface of the bumper wall member and a sectional area larger in a direction parallel to the surface of the bumper wall member than those of a piezoelectric vibrator of the receiving sensor.

8. An object detector comprising:
a vehicle bumper wall member, and
an ultrasonic sensor having a piezoelectric vibrator mounted on a back surface of the vehicle bumper wall member in contact with and concealed by the bumper wall member exterior region through the bumper wall member, and ultrasonic waves reflected from points exterior to the wall member are received by the piezoelectric vibrator back through the bumper wall member, wherein the thickness of the bumper wall member is less than one-half wavelength of the ultrasonic waves transmitted and received by the piezoelectric vibrator, and
a plate member is disposed between the bumper wall member and the ultrasonic sensor, said plate member having a higher ultrasonic wave propagation efficiency than the bumper wall member.

9. The object detector as in claim 8, wherein:
the plate member has a thickness which is less than one-half the wavelength of the ultrasonic waves transmitted and received by the piezoelectric vibrator.

10. The object detector as in claim 9, wherein:
the plate member has a thickness which is one-fourth the wavelength of ultrasonic waves transmitted and received by the piezoelectric vibrator.

11. The object detector as in claim 8, wherein:
a change in modulus of elasticity of the plate member caused by a change in temperature is smaller than a change in the modulus of elasticity of the bumper wall member caused by a change in the temperature.

12. The object detector as in claim 8, wherein:
an acoustic impedance of the plate member is smaller than that of the bumper wall member.

13. The object detector as in claim 8, wherein:
the plate member has different lengths in two opposing directions.

14. The object detector as in claim 8, wherein:
the plate member has a cross section perpendicular to a direction of thickness varying in the direction of thickness thereof.

15. The object detector as in claim 8, wherein:
the plate member is made of a metal; and
the bumper wall member is made of resin.

* * * * *